United States Patent
Borkovec et al.

(10) Patent No.: US 8,140,427 B2
(45) Date of Patent: Mar. 20, 2012

(54) SYSTEMS, METHODS AND COMPUTER PROGRAM PRODUCTS FOR ADAPTIVE TRANSACTION COST ESTIMATION

(75) Inventors: Milan Borkovec, Boston, MA (US); Ian Domowitz, New York, NY (US); Mahmoud El-Gamal, Sugar Land, TX (US); Hans G. Heidle, Quincy, MA (US); Aaron Schweiger, Brookline, MA (US); Konstantin Tyurin, Quincy, MA (US)

(73) Assignee: ITG Software Solutions, Inc., Culver City, CA (US)

( * ) Notice: Subject to any disclaimer, the term of this patent is extended or adjusted under 35 U.S.C. 154(b) by 266 days.

(21) Appl. No.: 12/424,886

(22) Filed: Apr. 16, 2009

(65) Prior Publication Data

US 2010/0268664 A1  Oct. 21, 2010

(51) Int. Cl.
*G06Q 40/00* (2012.01)
(52) U.S. Cl. ......................................................... 705/37
(58) Field of Classification Search ....................... 705/37
See application file for complete search history.

(56) References Cited

U.S. PATENT DOCUMENTS

| | | | |
|---|---|---|---|
| 2003/0233306 A1* | 12/2003 | Madhavan et al. | 705/37 |
| 2009/0024516 A1* | 1/2009 | Waelbroeck et al. | 705/37 |

OTHER PUBLICATIONS

International Search Report and Written Opinion of the International Searching Authority for corresponding International Application, PCT/US 10/31327, dated Jun. 10, 2010.

* cited by examiner

*Primary Examiner* — Olabode Akintola
(74) *Attorney, Agent, or Firm* — Rothwell, Figg, Ernst & Manbeck, P.C.

(57) ABSTRACT

A system, method and computer program product are provided for forecasting the transaction costs of a trade using empirical data and user-defined modeling constraints based on real-time data regarding changes in market conditions. In preferred embodiments, the invention acts as a forecaster whereby it accepts inputs from customers and identifies real-time market analytics, and provides dynamically adjusted ex ante cost estimates and metrics for the prevailing market conditions. Specific cost estimation and optimization algorithms can be provided to model transaction costs of a specific trade based on empirical data and real-time variables.

20 Claims, 5 Drawing Sheets

SYSTEMS, METHODS AND COMPUTER PROGRAM PRODUCTS FOR ADAPTIVE TRANSACTION COST ESTIMATION

BACKGROUND OF THE INVENTION

1. Field of the Invention

This invention relates generally to electronic securities trading. More particularly, the invention relates to systems, methods, and computer program products for optimizing securities trading strategies using, inter alia, estimated transaction costs and market data (both historical and real-time).

2. Background of the Related Art

In electronic trading, securities portfolio transactions typically incur transaction costs, and the minimization of these costs has been a long-standing aim of securities traders. Transaction costs may be large, especially when compared to gross returns, and thus, might substantially reduce or even eliminate the notional returns of a particular investment. Thus, there is a need to develop optimal trading strategies that minimize trading costs and/or some other objective criterion.

To this end, statistical and mathematical forecasting models have been developed in an attempt to estimate the transaction costs of a proposed trade prior to its execution. Such models typically build upon known empirical facts about trading costs. For example, empirical studies have established that costs increase with trade difficulty, a factor systematically related to order size (relative to average trading volumes), trade direction (BUYS vs. SELLS), firm size (Market Capitalization), risk (e.g., the volatility of security returns), liquidity (average daily share volume, spread), and price level.

However, existing statistical and mathematical forecasting models suffer from the inability to perform comprehensive and accurate analyses of transaction costs because they fail to adapt to intraday fluctuations in market conditions and rely on the assumption of market equilibrium, i.e., market neutrality. Also, many forecasters rely on structured mathematical or econometric models that require changes to the specification or estimation techniques to adapt to changes in the statistical properties or behavior patterns in the market. Further, these models calculate strategies before an order execution is started and assume that one follows the strategy independent of any changes in the realized market conditions.

Traditional models do not adequately consider the prevailing market sentiments in assessing the transaction costs of certain trades. Therefore, there is a need in the field for a forecasting model that adequately considers real-time data and intraday fluctuations in market conditions, and is adaptive to user inputs.

In particular, there is a need to provide a model that recommends an optimal trading strategy based on both trader's input and real-time market conditions. The model should be capable of updating transaction cost estimates throughout the trade execution horizon. In order to meet these needs and to overcome deficiencies in the field, and to provide other non-obvious features and advantages, the present invention includes systems, methods and computer program products that forecast the transaction costs of a proposed trade based on user-selected constraints and real-time data. The invention can also provide an optimized trading strategy to satisfy user-defined constraints.

SUMMARY OF THE INVENTION

The present invention provides systems, methods and computer program products for adaptive transaction cost estimation. In one embodiment of the present invention, the systems, methods and/or computer program products are seamlessly integrated into existing trading technology architectures, such that outputs may be accessed by other systems or products, and such that the trading strategies may be executed automatically or manually through one or more electronically accessible trade venues.

One embodiment of the current invention is a computerized method for adaptive transaction cost estimation. The computerized method is performed by executing a number of steps. First, at a trade optimization server, electronic information is received that defines a proposed order to trade one or more assets on an electronic exchange or marketplace. The electronic information is stored, by the trade optimization server, in an electronic data storage facility. The electronic information, for each of the one or more assets in the proposed order to trade, identifies: security name, symbol, or identifier; transaction side; and total quantity to be traded. Second, at the trade optimization server, electronic market data is received that includes historical market data and current market data relating to the one or more assets. Third, through the use of an optimization algorithm at the trade optimization server, an optimum trading strategy and a transaction cost estimate for implementing the proposed order are determined based upon the proposed trade order, at least one pre-selected trading parameter, and the electronic market data. Fourth, an indication of a quantity of the one or more assets to be traded in an upcoming time period according to the determined optimum trading strategy and the transaction cost estimate are outputted. The quantity to be traded is less than or equal to the total quantity to be traded. It is contemplated that in other embodiments of the current invention, the individual steps, listed above, may be performed in various orders or not at all.

One embodiment of the current invention is a system for adaptive transaction cost estimation in an electronic trading system. The system includes a trading optimization server configured to receive electronic information defining a proposed order to trade one or more assets on an electronic exchange or marketplace, to store the electronic information in an electronic data storage facility, to receive electronic market data (comprising historical market data and current market data) relating to the one or more assets, to determine (through the use of an optimization algorithm) an optimum trading strategy and a transaction cost estimate for implementing the proposed order (based upon the proposed trade order, at least one pre-selected trading parameter, and the electronic market data) and to output an indication of a quantity of the one or more assets to be traded in an upcoming time period according to the determined optimum trading strategy and the transaction cost estimate (the quantity to be traded being less than or equal to the total quantity to be traded). The electronic information includes, for each of the one or more assets in the proposed order to trade, information identifying: security name, symbol, or identifier; transaction side; and total quantity to be traded.

One embodiment of the current invention is a computer readable medium having stored thereon computer executable instructions for adaptive transaction cost estimation when executed by performing the following operations. First, at a trade optimization server, electronic information is received that defines a proposed order to trade one or more assets on an electronic exchange or marketplace. The electronic information is stored, by the trade optimization server, in an electronic data storage facility. The electronic information, for each of the one or more assets in the proposed order to trade, identifies: security name, symbol, or identifier; transaction side; and total quantity to be traded. Second, at the trade optimization server, electronic market data is received that includes historical market data and current market data relating to the one or more assets. Third, through the use of an optimization algorithm at the trade optimization server, an optimum trading strategy and a transaction cost estimate for implementing the proposed order are determined based upon the proposed trade order, at least one pre-selected trading parameter, and the electronic market data. Fourth, an indication of a quantity of the one or more assets to be traded in an upcoming time period according to the determined optimum trading strategy and the transaction cost estimate are outputted. The quantity to be traded is less than or equal to the total quantity to be traded. It is contemplated that in other embodiments of the current invention, the individual operations, listed above, may be performed in various orders or not at all.

BRIEF DESCRIPTION OF THE DRAWINGS

FIGS. 3-5 are screen shots of exemplary user interfaces according to embodiments of the present invention.

DETAILED DESCRIPTION OF THE INVENTION

The present invention provides systems, methods and computer program products for adaptive transaction cost estimation. The present invention may include features allowing users to adapt the transaction cost model based upon their own beliefs regarding the market conditions that would prevail in the near future. Because market conditions affect trading costs, and therefore impact market participant trading strategies, effective cost estimates should be adaptive to prevailing market conditions. The present invention may be integrated into or be coupled with known trading systems, trading venues, and other systems and applications used in effecting and managing securities trading and trade data. Embodiments of the present invention may be used in connection with many different types of asset classes, including, but not limited to: securities, index futures, options, F/X, etc. Embodiments of the present invention may be used in trading exchanges across the world, such as, but not limited to: New York Stock Exchange, Australian Securities Exchange, Hong Kong Stock Exchange, Shanghai Stock Exchange, and London Stock Exchange.

Unlike most pre-trade models, the transaction cost model of the present invention (the "TC model") does not rely on any assumption of market neutrality or market equilibrium. That is, the invented TC model does not assume that estimated pre-trade costs are entirely based on one's own trading strategy and the associated price impact. The assumption of most pre-trade models is that the trade imbalance without one's own trading would be zero.

The present invention eliminates the necessity of the market neutrality assumption. The function/distribution H, utilized in the present invention considers the effects of one's trading strategy by relating a given trade size to the trade imbalance and other market conditions in the market over a certain time period. The present invention allows for a market to be out of equilibrium even in the absence of one's own trading, and also allows for the market to potentially react to one's own trading, e.g., due to herding behavior. Additionally, the present invention allows a user to input one's own beliefs into the model, for example, through the function/distribution H. These inputs change the empirical distributions underlying the model and in turn change the calculated optimal solution (strategy).

According to a preferred embodiment, the present invention includes special purpose electronic facilities for modeling two cost components: (1) costs within a time period or bin, (effective spread, often referred to as temporary price impact), and (2) costs across bins (law of motion, often referred to as permanent price impact). In contrast to most transaction cost models, the invented TC model does not rely exclusively on modeling the first and second moment of the cost components, but rather, models the entire distribution of F (the law of price motion) and G (the effective spread within a bin) using a non- or semi-parametric approach.

Further, the invented TC model does not model the effect of one's own trading on price and costs directly. The direct price impact of one's own trade size on prices and costs is actually removed. Instead, there is an indirect impact on prices/costs through the effect of one's own trading on the market trade imbalance and/or other market attributes. The function/distribution H of the trade imbalances and other market attributes is estimated directly from execution data, while F and G can be estimated using publicly available Level 1 or Level 2 data. The function/distribution H can include not only trade imbalances but also volume, volatility, spread, depth, to capture the effect of a client's trading even better and, most importantly, how the market participant affects various aspects of the stock dynamics.

When provided with an order size and the existing market sentiment, the present invention is configured to calculate a cost distribution of possible outcomes including the mean, E, and the expected average execution price, avg, over the specified time frame. The invented TC model can also suggest optimal bounds for the number of shares to be traded in the specified time interval. Thus, the invented TC model can provide not only the ex-ante optimal strategy but also the simulated ex-post strategies for different outcomes. This feature of the model allows a trader to understand and assess the acceptable magnitude of deviation without facing the risk of executing a trade and incurring an unacceptable adverse affect due to opportunity costs from normal market conditions.

The present invention can be utilized to trade more or less aggressively, depending on whether the stock is moving up or down. This can be particularly useful in volatile markets where rapid price movements can result in significantly higher costs and traders must complete orders at the best price possible.

Regarding modeling constraints, the present invention can be configured to allow for modeling tail behavior (via the expected shortfall) and accommodate the possibility that the order does not have to be fully completed, by specifying a threshold for the expected costs below which order execution is possible, and estimating the expected amount that can be filled.

The present invention includes a dynamic and adaptive model. Real-time data information can be utilized as soon as it becomes available and, as described in further detail below, optimizations can be run repeatedly over specified time intervals, thereby adapting an optimal trading strategy to the most up-to-date information available. It is not assumed that one would follow a pre-determined trading strategy identified prior to initiating the order execution without considering changes in the market conditions. Any strategy that may be optimal and appropriate at the moment when the order is initiated will no longer be optimal even a short time later as market conditions fluctuate and one observes the realized executions, which can be more or less than what the strategy called for, resulting in the need for modification of the execution strategy.

The present invention can explicitly account for signals about the prevailing market conditions during the execution of an order. Signals may be constructed simultaneously for many variables including volatility, volume, spread, and depth of the market. Some of these real-time variables can be specialized in the form of "smart indicators." Smart indicators are discrete variables that provide indication of abnormal market conditions. Co-owned/co-pending U.S. patent application Ser. No. 11/476,895. titled System and Method for Generating Real-Time Smart Indicators to Indicate Abnormal Conditions in a Trading List or Portfolio, and filed on Jun. 29, 2006, includes a detailed discussion of smart indicators, the entire contents of which are herein incorporated by reference. The present invention can combine the smart indicator values with the set of definitions describing how this information can be embedded into the optimization problem. For instance, the TC model suggests that abnormally high volatility surprises will often lead to higher than normal costs in the following short time frame, suggesting that trading should be slowed down.

Unlike models utilized in the prior art, which define an objective function as a trade-off between expected costs and the standard deviation of costs, the present invention allows for flexibility in the formulation of the objective function.

As can be readily understood by a person of ordinary skill in the art, in alternative embodiments of the present invention, proposed trade executions can be automatically transferred within the network from one server operating according to a first trade strategy algorithm to another server having a second different trade strategy algorithm.

Figure 1:
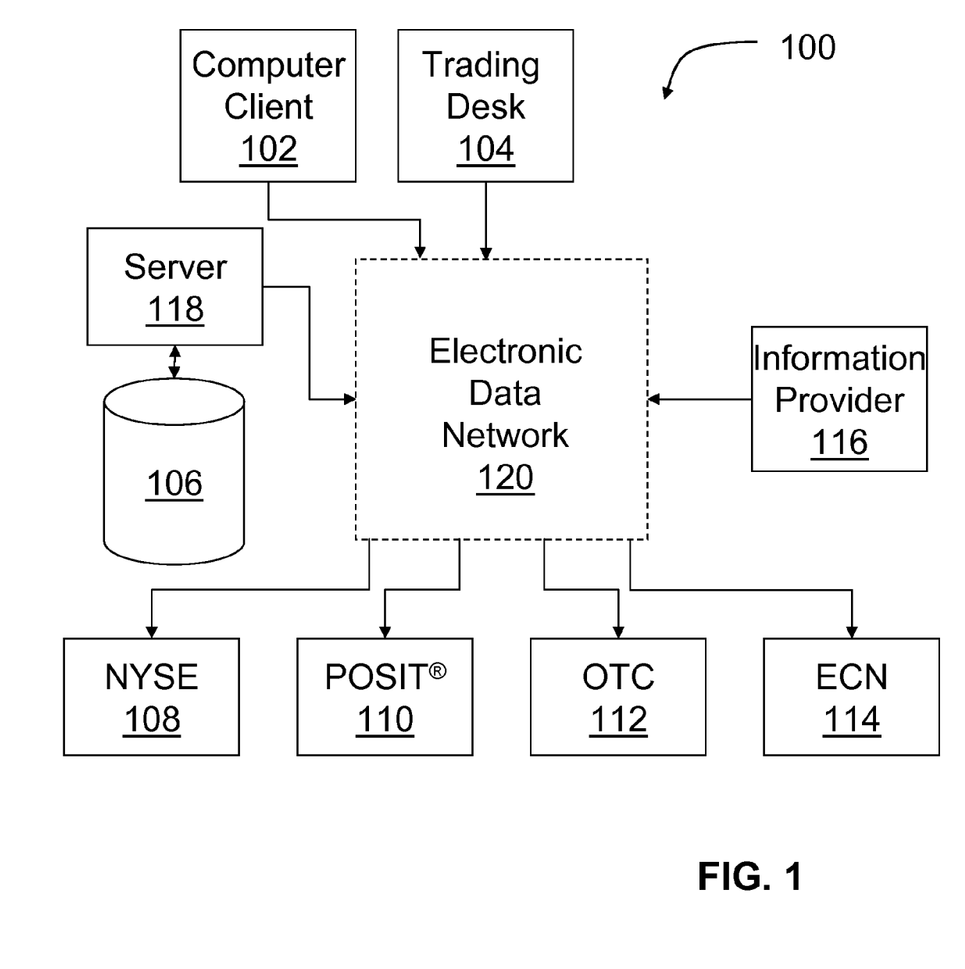
FIG. 1 is a block diagram of an exemplary trading system in which aspects of the present invention may be applied.

FIG. 1 is a block diagram of a simplified trading system in which embodiments of the present invention may be applied.

Referring to FIG. 1, system 100 may include a plurality of specially programmed computers at various locations, which may be coupled with an electronic data network 120. For example, computer client 102 can be a networked computer configured to communicate desired trades or trade orders. In one embodiment of the present invention, trading desk 104 might be associated, for example, with a buy-side trading desk at a buy-side trading institution. The trading desk may include one or more computers coupled with electronic data network 120 and configured to execute various trade desk programs, such as, order management systems (OMS), execution management systems (EMS), and to generate trade analytics. Trade systems may be used to manage long-term and short-term trading goals, and to connect electronically to electronic trade venues, such as the New York Stock Exchange (NYSE) 108, ITG's POSIT® 110, over-the-counter (OTC) venues 112 (including, but not limited to, NASDAQ), or electronic communications networks (ECNs) 114. The aforementioned list of electronic trade venues is not all encompassing, and in no way limits the range of trade venues that the current invention might integrate or communicate with. For example, the current invention contemplates the use of indications-of-interest, and thus might integrate or communicate with an indication-of-interest venue, such as ITG's POSIT ALERT.

The electronic data network 120 may include public or private networks, electronic data networks, packeted networks, wireless or other communication services, etc. In one embodiment of the present invention, the electronic data network 120 might include the Internet and/or a local area network. Server 118 may be coupled with the electronic data network 120 and may be configured to perform adaptive transaction cost estimation, as described below in further detail. The server 118 may have access to various electronic trading venues (108, 110, 112, 114) through the electronic data network 120. Server 118 may also be in communication with a database 106. The database 106 may be housed on server 118 or on a separate computer, i.e., a database server. The database 106 may be a relational database, such as an ORACLE database.

System 100 can include an information provider 116, which may feed market data to the server 118 though the electronic data network 120. Both historical and real-time trade data may be provided to the server 118. Additionally, trade data fed from the information provider 116 may also be stored in the database 106, and thus be readily accessible via server 118.

Even though FIG. 1 shows only one server 118, it is contemplated that multiple servers may be provided on the electronic network 120, with each server running a variety of applications, which may include transaction cost analysis programs. Likewise, these additional servers may have access to various trading venues (108, 110, 112, 114).

A user may electronically submit a proposed portfolio trade order, through computer client 102, for analysis, optimization, and/or reconstruction to server 118. This submission may occur automatically, that is, without explicit action by the user at the time of the order submission. One way this submission might be implemented is through the use of defaults. For example, when a user sends a trade to OTC 112, via their OMS, it is contemplated that the order might first be transmitted electronically by default, to server 118 as a proposed order with the goal of identifying or creating the best strategy for executing the order. Once the optimal trading strategy has been identified or created, it can be displayed or otherwise communicated to the user of the system. Further, the user may configure the system not to display the results of the optimization. Furthermore, it is contemplated that once the optimal strategy has been identified, the system may, if designated to do so, automatically carry out the execution of the order by creating and submitting electronic orders according to the created/identified optimal strategy.

Figure 2:
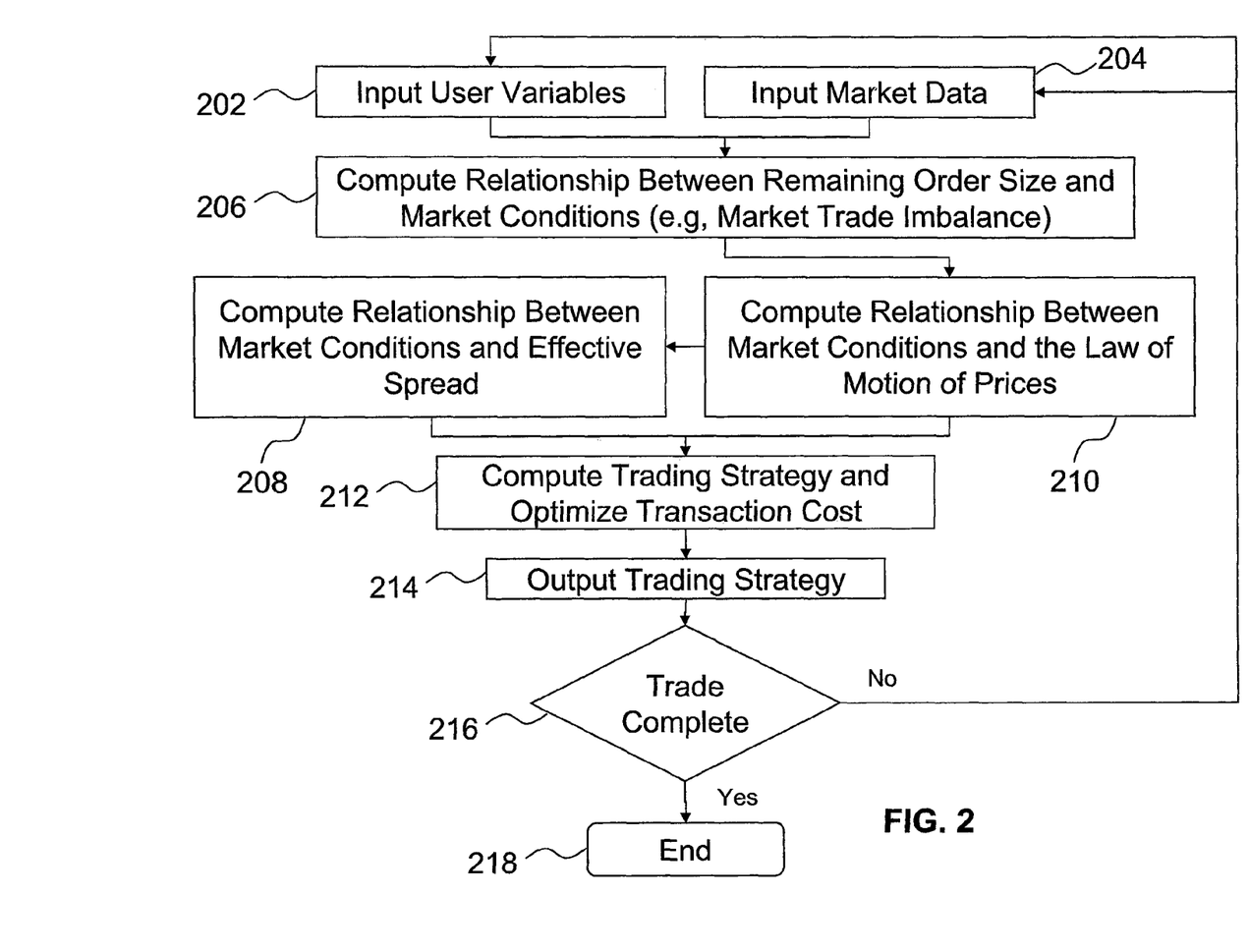
FIG. 2 is a flow diagram of an exemplary method for performing the steps of the present invention.

FIG. 2 is a flow diagram detailing steps of an embodiment of the present invention. Other embodiments of the present invention may utilize all or some of the steps listed in FIG. 2, in the same or a different order. FIG. 2 in no way limits the scope of the present invention to the steps shown therein and described below.

The steps shown in FIG. 2 may be executed iteratively during a trading period. The trading period can be broken up into smaller sub-periods called bins. In one embodiment, the present invention contemplates that the trading period may be a trading day that is broken into 13 thirty-minute bins. Thus, the present invention contemplates that the steps shown in FIG. 2 may be run prior to each bin. However, because the trading circumstances may deviate during the trading day from what the user expects, the steps shown in FIG. 2 may run on demand (i.e., at any time or continuously) or be automatically triggered by some event, such as a larger than normal trade.

At step 202, the user of the system (i.e., a portfolio manager, trader, or other market participant) may input variables regarding the proposed trades that the user intends to execute. For example, a user could input variables relating to a desire to BUY 1,000,000 shares of IBM with a LIMIT price of $85.50. Alternatively, an order may be defined by the following parameter list: ticker, date, order size, starting bin (s), ending bin (e). These inputs may be entered all at once or multiple times, and may be changed or updated at any time prior to, during, or after the trading period, as shown in FIG. 2 by the line connecting step 216 to steps 202 and 204.

Additionally, the user may input other parameters that define factors or preferences that affect the way that the trading will occur. For example, the user may choose: various levels of acceptable risk, time horizons for trades to be completed, urgency levels, predicted market conditions, and/or level of discretion (i.e., what types of orders, market or limit, the user is trading with, and what percentage of each type of order the user expects to execute). While step 202 is described above in terms of a user "inputting" information, it is contemplated that current trading technology may allow for integrations between various systems to allow for information in one system, such as a user's OMS, to be transmitted into another system, such as the system of the current invention, with or without manual intervention by the user. For example, it is contemplated that a user may set defaults directed to which orders should be accessed and submitted to the system of the present invention. Likewise, a user may set defaults for the input variables that affect the way in which the trading will occur, as discussed above. For example, if a particular risk averse user always prefers the lowest level of risk, the current invention contemplates that for this user the lowest level of risk may be set explicitly as a default value.

At step 204, market data may be input into the system of the present invention. This market data may include both historical market/trading data and real-time market data. Historical market/trading data can include all market data from trading that has occurred prior to the current trading period, e.g., the current trading day. By utilizing real-time market optimizing data, functions (e.g., H, G, and F, as described in greater detail below) may be changed dynamically. Real-time market data can include data obtained in real time during the current trading period, e.g., the current trading day or the recent history. While the system of the present invention may have access to a vast bank of market data, not all of the accessible market data must be utilized. For example, the system may utilize information pertaining to the security that the user intends to trade and/or other securities that have similar characteristics and/or trading patterns to the security that the user intends to trade. It is contemplated that associations between securities may be generated in real-time or be pre-formed, and based upon characteristics and/or trading patterns of the securities. These relationships may be stored in one or more electronic data storing facilities connected to the electronic data network of the present invention. Additionally, it is contemplated that historical data may be weighted depending on the age/relevance of the trade data. Embodiments of the present invention may utilize, but are not limited to, market data including: the real-time spread, volume, and volatility, as well as the historical spread, volume, and volatility, for the particular security under consideration.

At step 206, the system computes the relationship between the remaining order size and the market imbalance. This relationship may be computed utilizing the H Function. The H Function describes the stochastic relationship between the user's remaining order size and its impact on the market trade imbalance (the difference between buyer and seller initiated volume) for a certain sub-period (bin) of the trading period. The remaining order size should be used because this variable will continually decrease due to the iterative nature of the present invention.

In one embodiment of the present invention, the H Function is empirically estimated from peer group data. This data may include information on trade executions, and may be stored in a database that may be integrated with or connected to the system of the present invention, such as ITG's Peer Group Database, as described in the co-owned/co-pending U.S. patent application Ser. No. 10/674,432 titled System and Method for Estimating Transaction Costs Related to Trading a Security, and filed on Oct. 1, 2003. the entire content of which is herein incorporated by reference into the present application. In order to minimize the influence of data that could improperly skew the results of the H Function, i.e., noise, the securities in the peer group may be categorized into liquidity groups. For example, the universe of all securities may be split into four liquidity groups, where the liquidity groups can be defined via the average daily local currency volume of the universe of all securities.

For each order, the relative order size is determined and compared with the associated market trade imbalance. For example, when analyzing a one-day order, the relative order size (S/ADV) is determined by dividing the remaining order size with the previous day's 21 day median daily dollar volume. This value is compared with the associated trade imbalance (TI/ADV) determined by finding the difference between the net BUYS and SELLS volume divided by the previous day's 21 day median daily dollar volume. Next, the pairs $(S_i/ADV_i, TI_i/ADV_i)_i$ may be segmented into (1) the corresponding liquidity group, as described above, and then (2) the relative remaining order size.

In one embodiment of the present invention, the relative remaining order size may be determined for each liquidity group separately. For each liquidity group, the securities universe may be divided into 100 order size buckets. The buckets may be constructed so that there are enough observations per bucket. For each bucket, all percentiles (1 though 99) of the conditioned empirical distribution of (TI/ADV) given the value of x=(S/ADV) may be determined. Additionally, these percentiles may be used to approximate the conditional mean E(TI/ADV|x) and conditional standard deviation SDV(TI/ADV|x) of each bucket.

Next, the parametric forms of functions e(x)=E(TI/ADV|x) and sdv(x)=SDV(TI/ADV|x) may be estimated. These parameterizations may be approximated using the following functions:

$$e(x) = E(TI/ADV \mid x)$$
$$= \begin{cases} \beta_e \cdot x, & x \leq x_e \\ \beta_e \cdot x_e \cdot \left(1 + \frac{(x-x_e)}{\alpha_e \cdot x_e}\right)^{\alpha_e}, & \text{else} \end{cases}$$

$$sdx(x) = SDV(TI/ADV \mid x)$$
$$= \begin{cases} y_{sdv}, & x \leq x_{sdv,1} \\ y_{sdv} + \beta_{sdv} \cdot (x - x_{sdv,1})^{\alpha_{sdv,1}}, & x_{sdv,1} < \leq x_{sdv,2} \\ c_{sdv} \cdot \left(1 + \frac{\beta_{sdv} \cdot \alpha_{sdv,1} \cdot \left(\frac{x_{sdv,2} -}{x_{sdv,1}}\right)^{\alpha_{sdv,1}-1} \cdot (x - x_{sdv,2})}{\alpha_{sdv,2} \cdot c_{sdv}}\right)^{\alpha_{sdv,2}}, & \text{else} \end{cases}$$

where
$c_{sdv}$=SDV(TI/ADV|$x_{sdv,2}$)=$y_{sdv}$+$\beta_{sdv}\cdot(x_{sdv,2}-x_{sdv,1})^{\alpha_{sdv,1}}$;
$\beta_e \in (0,1)$, $\alpha_e \in [0.1,1]$ and $x_e \in \{avgSize_1, \ldots, avgSize_{100}\}$ are the parameters that need to be estimated for the function e(x) (the average sizes are the mean relative order sizes in each bucket and thus ordered), and $\beta_{sdv} \in (0,1)$, $\alpha_{sdv,1} \in [0.1,1]$, $\alpha_{sdv,2} \in [0.1,1]$, $x_{sdv,1}, x_{sdv,2} \in \{avgSize_1, \ldots, avgSize_{100}\}$ and $\gamma_{sdv}$ are the parameters that need to be estimated for the function sdv(x) ($y_{sdv}$ is the average trade imbalance value associated to $x_{sdv,1}$). All parameters can be estimated using standard estimation techniques, e.g., grid searches.

In one embodiment of the present invention, once the computation of the H Function, i.e. the stochastic relationship between the user's remaining order size and the market trade imbalance, is completed, a potential trade imbalance is fed into step 210. This allows the G and F Functions to reflect the relationship determined in step 206, and thus alleviate the assumption of market neutrality and equilibrium in the G and F Functions. Additionally, the H Function may be used to determine the potential volume, potential volatility, potential spread, potential depth, and other qualities characterizing the market conditions relevant for execution of the potential order.

At step 210, the system, computes the relationship between the market trade imbalance and the Law of Motion of Prices. Whereas step 208 is related to the temporary price impact, step 210 is related to the permanent price impact. The F Function determines the relationship between the market trade imbalance and the Law of Motion of Prices, i.e., the permanent price impact. The F Function depends on the market trade imbalance, and (through the data output by the H Function) on the remaining order size. Additionally, the F Function may utilize historical stock-specific characteristics and real-time market conditions.

The F Function can be is defined as:

$$F_{i,j}^a = \frac{P_{t,j}^a - P_{t,j-1}^a}{P_{t,j-1}^a} \frac{1}{\overline{\sigma}_{i,j}^a},$$

where $\tilde{P}_{i,j}^a$ is the volume-weighted average execution price in bin j of day t of security a and $\overline{\sigma}_{i,j}^a$ is the historical volatility of stock a in bin j. The F Function, of the current embodiment, may utilize the following historical stock-specific characteristics: average volume, average volatility, average spread, and the previous day's closing price. The F Function also may take into consideration and compensate for real-time market conditions, such as: surprises in a security's volume, volatility, and/or spread. The output of this step is the distribution (per bin or per trading period) of the permanent price impact.

At step 208, the system computes the relationship between the market trade imbalance, and, in some embodiments, computes other market conditions and the effective spread. One purpose of this step is to determine the temporary price impact of trading the remaining order size. The G Function can be utilized to determine the relationship between the market trade imbalance and the effective spread. The G Function depends on the market trade imbalance, and (through the data output by the H Function) on the remaining order size. Additionally, the G Function may utilize historical stock-specific characteristics and real-time market conditions.

The G Function can be defined as:

$$G_{i,j}^a = \frac{\tilde{P}_{i,j}^a - P_{i,j-1}^a}{P_{i,j-1}^a} \frac{1}{\overline{\sigma}_{i,j}^a} - \frac{1}{2}F_{i,j}^d,$$

where $\tilde{P}_{i,j}^a$ is the volume-weighted average execution price in bin j of day i of security a and $\overline{\sigma}_{i,j}^a$ is the historical volatility of stock a in bin j. The G Function may utilize the following historical stock-specific characteristics: average volume, average volatility, average spread, and/or the previous day's closing price. The G Function may also take into consideration and compensate for real-time market conditions, such as: unexpected security volume (i.e. lower than average, higher than average, etc. . . . ), volatility, and/or spread. The output of this step is the distribution (per bin or per trading period) of the realized effective spread. However, when compared to the G Function, the F Function may rely less on the real-time spread. For both the G and F Functions, the real-time volatility and volume are typically the most important of the real-time market conditions.

In one embodiment of the present invention, once steps 208 and 210 have been completed, i.e., the joint distribution of the F and G functions is obtained, the outputs are fed into step 212, where an optimal trading strategy may be computed prior to each bin. The optimal trading strategy may or may not be a projection that extends past the upcoming bin. That is, because the remaining order size and trading environment may change during the trading period, it is not necessarily efficient to output trading strategies that will need to be subsequently revised based on the activity during the upcoming bins. However, situations may arise that call for projected trading strategies extending past the upcoming bin.

In one embodiment of the present invention, the objective function used in the optimization of step 212, may be configured to solve for the optimal trading strategy in the most efficient fashion (for example, in the smallest possible number of iterations). The objective function should also ensure stability, such that optimal trading strategy does not change drastically when the inputs are changed slightly.

In the discussion of the optimization functions we use the notation: e=T, i.e., the close of the terminal bin, and remaining order size, $N_s$ and s=0, 1, 2 . . . T. Let $(x_j)_{j=s,\ldots,T}$ be a given specified strategy from starting bin (s) to ending bin (e), (or T if the ending bin is the close of trading period). $MC_s$ is the set of parameters characterizing the actual market conditions observed at time s (which is the start time of bin (s)), and $SC_s$ is the set of parameters containing the stock-specific characteristics in bin (s) (e.g., liquidity group, spread, ADV, volatility). The market conditions at the starting bin ($MC_s$) are given by the previously observed volume, volatility, spread, and previous day's volatility. ($MC_s$) are dynamically updated while ($SC_s$) are pre-determined. In one embodiment of the current invention, the market conditions may be summarized using the following scale:

| | |
|---|---|
| −1: | unconditioned |
| 0: | low volatility, low volume |
| 1: | low volatility, medium volume |
| 2: | low volatility, high volume |
| 3: | medium volatility, low volume |
| 4: | medium volatility, medium volume |
| 5: | medium volatility, high volume |
| 6: | high volatility, low volume |
| 7: | high volatility, medium volume |
| 8: | high volatility, high volume |

In one embodiment of the present invention, the system can compute the mean and the projected percentiles of the associated distribution of costs, by combining the inputs from step 202 (e.g., starting bin (s), ending bin (e) (or T if e is the closing bin of the trading period, i.e., e=T=12 for U.S. trading if the bins have 30-minute interval lengths), order size $N_s$, ticker or stock-specific historical characteristics $SC_s$, and the prevailing market conditions $MC_s$) at the start of each bin (s) with the trading strategy $(x_j)_{j=s\ldots T}$, where the cost is defined as $$Cost_s = \frac{\left(\sum_{t=s}^{T} x_t \tilde{P}_{t+1}\right) - N_s P_s}{N_s P_s}.$$

Thus, the system can compute the mean and the percentiles using the following equations:

$$E(Cost_s|(x_j)_{j=s,\ldots,T}, N_s, SC_s, MC_s)$$

and $(Pct_{s,d}(Cost_s|(x_j)_{j=s,\ldots,T}, N_s, SC_s, MC_s))_{d=1,\ldots,99}$.

The current invention contemplates a number of alternative objective functions that may be used in step 212. However, none of the functions described below are intended to limit the scope of the current invention in any way.

A basic optimization function may be utilized in finding the optimal trading strategy at step 212. One basic optimization function contemplated in the current inventions is:

$$(x_t^*) = \arg\min_{(x_j)_{j=s,\ldots,T}} \{E(Cost_s | (x_j)_{j=s,\ldots,T}, N_s, SC_s, MC_s)\}.$$

While this solution provides a suitable answer, more precise solutions may be derived using more complex optimization functions. The following five optimization functions are more complex than the basic optimization function, and yield a richer framework of analysis. Each of the functions listed below have been contemplated as suitable for performing step 212.

A two step optimization procedure may be used in step 212. The following is one embodiment of the two step optimization:

Step 1:

$$(x_j^*) = \arg\min_{(x_j)_{j=s,\ldots,T}} \{E(Cost_s | (x_j)_{j=s,\ldots,T}, N_s, SC_s, MC_s)\},$$

$$C_s^* = E(Cost_s | (x_j^*)_{j=s,\ldots,T}, N_s, SC_s, MC_s)$$

Step 2: Find solutions $(x_j^{(low)})_{j=s,\ldots,T}$ and $(x_j^{(up)})_{j=s,\ldots,T}$ such that:

$$E(Cost_s | (x_j^*)_{j=s,\ldots,T}, N_s, SC_s, MC_s) + \Delta = E\left(\frac{Cost_s | (x_j^{(low)})_{j=s,\ldots,T}}{N_s, SC_s, MC_s}\right)$$

$$= E\left(\frac{Cost_s | (x_j^{(up)})_{j=s,\ldots,T}}{N_s, SC_s, MC_s}\right)$$

and $x_s^{(low)} < x_s^* < x_s^{(up)}$ for some $\Delta > 0$ that is supplied to the optimization problem as well. It is likely that users of the system of the current invention will have the best intuition when viewing the results of the optimization program presented in total dollars, and thus $\Delta$ would probably vary with the order size (more precisely, $\Delta(N_s) \downarrow$ as $N_s \uparrow$).

Alternatively, risk averse objective functions may be utilized in the optimization program at step 212. One contemplated objective function may be as follows:

$$(x_j^*)_{j=s,\ldots,T} = \arg\min_{(x_j)_{j=s,\ldots,T}} \{E(u(Cost_s) | (x_j)_{j=s,\ldots,T}, N_s, SC_s, MC_s)\},$$

where u(z) is supposed to be a convex function. The following two functions are examples:

$$u(z) = \frac{1}{\gamma} \cdot (e^{\gamma \cdot z} - 1), \quad \text{a)}$$

$$u(z) = \begin{cases} z, & \text{if } z < \alpha \\ z + \delta \cdot z, & \text{else} \end{cases} \quad \text{b)}$$

Alternatively, an optimization function may include value-at-risk (VaR) constraints. These constraints allow a user to strike a balance between minimizing cost and risk. One contemplated approach in quantifying risk is to specify a maximum or critical level of value-at-risk ($VaR_s^{crit}$) that should not be exceeded with more than probability $\alpha$. Both $VaR_s^{crit}$ and $\alpha$ may be provided by the user; however, $VaR_s^{crit}$ and $\alpha$ can be set as defaults. For example, in one embodiment $\alpha$ will be set to a default value of 0.05 if not user specified. While $VaR_s^{crit}$ may be represented in various forms, it is likely most useful when it is measured in dollars and translated to basis points by the system. The following is an example of the optimization function that includes VaR constraints:

$$\min_{(x_j)_{j=s,\ldots,T}} \{E(Cost_s | (x_j)_{j=s,\ldots,T}, N_s, SC_s, MC_s)\}$$

given that $P(Cost_s > VaR_s^{crit}) \leq \alpha$.

In order to evaluate the probability, $P(Cost_s > VaR_s^{crit}) \leq \alpha$, it is necessary to use $(Pct_{s,d}(Cost_s|(x_j)_{j=s,\ldots,T}, N_s, SC_s, MC_s))_{d=1,\ldots,99}$. Unfortunately, for some values of $VaR_s^{crit}$ and $\alpha$, the optimization problem listed above has no solution. When a non-solution event occurs, the system at step 212 may follow any of the following courses of action: (1) do nothing and provide an error message to the user, (2) allow the user to change (increase) the VaR parameter $VaR_s^{crit}$, or (3) inform the user what the maximal number of shares $N_s^{filled} = N_s^{filled}(VaR_s^{crit})$ (order size) that can be filled, and for which an optimal strategy can be provided would be. Obviously, when the third option is chosen, $N_s^{filled} \leq N_s$.

Alternatively, the optimization problem may be specified to have a Markov decision process structure. Rather than provide one and only one optimal number of shares to be traded, it may be beneficial to provide an interval in which the "actual" optimal number of shares to be traded in bin (s) can be found (with a very large probability).

In utilizing the optimization function may have a Markov decision process structure, let $F_j(\cdot|TI_j, SC_s, MC_s)$ and $G_j(\cdot|TI_j, SC_s, MC_s)$ be the F and G functions, as described above, for j=s+i, T. The following describes a way to provide a confidence interval of optimal number of shares to trade in bin (s) assuming that the future outcome of market conditions in bin (s) is known.

In order to simplify the problem and speed up performance, the system may only sample the volume and volatility surprises $vol_s^{surprise}$ and $vola_s^{surprise}$, while the remaining market conditions are held fixed at their prevailing values. Therefore, $MC_s = (otherMC_s, vol_s^{surprise}, vola_s^{surprise})$.

When using this optimization technique, the user may be allowed to select a confidence interval for volume and volatility surprises in bin (s) (or alternatively use plus or minus one standard deviation based on the ITG proprietary smart indicator distributions). Thus, $\text{vol}_{s+1}^{surprise} \in [\text{vol}_{s+1}^{surprise,low}, \text{vol}_{s+1}^{surprise,up}]$ and $\text{vola}_{s+1}^{surprise} \in [\text{vola}_{s+1}^{surprise,low}, \text{vola}_{s+1}^{surprise,up}]$, where $\text{vol}_{s+1}^{surprise,low} = \text{vol}_s^{surprise} - \Delta_{s,low}$, $\text{vol}_{s+1}^{surprise,up} = \text{vol}_s^{surprise} + \Delta_{s,up}$, $\text{vola}_{s+1}^{surprise,low} = \text{vola}_s^{surprise} - \Psi_{s,low}$, and $\text{vola}_{s+1}^{surprise,up} = \text{vola}_s^{surprise} + \Psi_{s,up}$.

Next, the following five optimization programs are solved:

use the regular values $\text{vol}_s^{surprise}$ and $\text{vola}_s^{surprise}$, to determine $(x_j^*)_{j=s,\ldots,T} = \arg_x \min E(\text{Cost}_s|(x_j^*)_{j=s,\ldots,T}, N_s, SC_s, \text{otherMC}_s, \text{vol}_s^{surprise}, \text{vola}_s^{surprise})$ use $\text{vol}_{s+1}^{surprise,low}$ and $\text{vola}_{s+1}^{surprise,low}$ and use $F_j(\cdot|TI_j, SC_s, MC_{s+1})$ and $G_j(\cdot|TI_j, SC_s, MC_{s+1})$ instead of $F_j(\cdot|TI_j, SC_s, MC_s)$ and $G_j(\cdot|TI_j, SC_s, MC_s)$ for $j=s+1, s+2, \ldots, T$, $\Rightarrow (x_j^{*,low,low})_{j=s,\ldots,T}$, $C^{*,low,low} = E(\text{Cost}_s|(x_j^{*,low,low})_{j=s,\ldots,T}, N_s, SC_s, \text{otherMC}_s, \text{vol}_{s+1}^{surprise,low}, \text{vola}_{s+1}^{surprise,low})$ use $\text{vol}_{s+1}^{surprise,low}$ and $\text{vola}_{s+1}^{surprise,up}$ and use $F_j(\cdot|TI_j, SC_s, MC_{s+1})$ and $G_j(\cdot|TI_j, SC_s, MC_{s+1})$ instead of $F_j(\cdot|TI_j, SC_s, MC_s)$ and $G_j(\cdot|TI_j, SC_s, MC_s)$ for $j=s+1, s+2, \ldots, T$, $\Rightarrow (x_j^{*,low,up})_{j=s,\ldots,T}$, $C^{*,low,up} = E(\text{Cost}_s|(x_j^{*,low,up})_{j=s,\ldots,T}, N_s, SC_s, \text{otherMC}_s, \text{vol}_{s+1}^{surprise,low}, \text{vola}_{s+1}^{surprise,up})$ use $\text{vol}_{s+1}^{surprise,up}$ and $\text{vola}_{s+1}^{surprise,low}$ and use $F_j(\cdot|TI_j, SC_s, MC_{s+1})$ and $G_j(\cdot|TI_j, SC_s, MC_{s+1})$ instead of $F_j(\cdot|TI_j, SC_s, MC_s)$ and $G_j(\cdot|TI_j, SC_s, MC_s)$ for $j=s+1, s+2, \ldots, T$, $\Rightarrow (x_j^{*,up,low})_{t=s,\ldots,T}$, $C^{*,up,low} = E(\text{Cost}_s|(x_j^{*,up,low})_{j=s,\ldots,T}, N_s, SC_s, \text{otherMC}_s, \text{vol}_{s+1}^{surprise,up}, \text{vola}_{s+1}^{surprise,low})$ use $\text{vol}_{s+1}^{surprise,up}$ and $\text{vola}_{s+1}^{surprise,up}$ and use $F_j(\cdot|TI_j, SC_s, MC_{s+1})$ and $G_j(\cdot|TI_j, SC_s, MC_{s+1})$ instead of $F_j(\cdot|TI_j, SC_s, MC_s)$ and $G_j(\cdot|TI_j, SC_s, MC_s)$ for $j=s+1, s+2, \ldots, T$, $\Rightarrow (x_j^{*,up,up})_{j=s,\ldots,T}$, $C^{*,up,up} = E(\text{Cost}_s|(x_j^{*,up,up})_{j=s,\ldots,T}, N_s, SC_s, \text{otherMC}_s, \text{vol}_{s+1}^{surprise,up}, \text{vola}_{s+1}^{surprise,up})$ Alternatively, step 212 may utilize an optimization technique that is conditioned on the market trade imbalances in the start bin (s). Again, rather than provide one and only one optimal number of shares to be traded, it may be beneficial to provide an interval in which the "actual" optimal number of shares to be traded in bin (s) can be found (with a very large probability). However, instead of varying volume and volatility surprises, as discussed above with regard to optimization functions that include Markov decision process structures, it is possible to optimize by varying the market trade imbalances.

The functions are as follows:

$$E(\text{Cost}_s | (x_t)_{t=s,\ldots,T}, N_s, SC_s, MC_s) =$$
$$E(E(\text{Cost}_s | (x_t)_{t=s,\ldots,T}, N_s, SC_s, MC_s, TI_{s+1}) | (x_t)_{t=s,\ldots,T},$$
$$N_s, SC_s, MC_s) =$$
$$E(E(\text{Cost}_s | (x_t)_{t=s,\ldots,T}, SC_s, MC_s, TI_{s+1}) | (x_t)_{j=s,\ldots,T}, N_s, SC_s, MC_s)$$

Thus, it is possible to compare how the optimal strategy changes based on changes in $TI_{s+1}$. More precisely, following five optimizations:

run regular optimization, i.e. $(x_j^*)_{j=s,\ldots,T} = \arg_x \min\{E(\text{Cost}_s|(x_j)_{j=s,\ldots,T}, N_s, SC_s, MC_s)\} \Rightarrow (x_j^*)_{j=s,\ldots,T}$ $(x_j^{*10})_{j=s,\ldots,T} = \arg_x \min\{E(\text{Cost}_s|(x_j)_{j=s,\ldots,T}, N_s, SC_s, MC_s, TI_{s+1} = \text{PctH}_{10})\} \Rightarrow (x_j^{*10})_{j=s,\ldots,T}$ $(x_j^{*25})_{j=s,\ldots,T} = \arg_x \min\{E(\text{Cost}_s|(x_j)_{j=s,\ldots,T}, N_s, SC_s, MC_s, TI_{s+1} = \text{PctH}_{25})\} \Rightarrow (x_j^{*25})_{j=s,\ldots,T}$ $(x_j^{*75})_{j=s,\ldots,T} = \arg_x \min\{E(\text{Cost}_s|(x_j)_{j=s,\ldots,T}, N_s, SC_s, MC_s, TI_{s+1} = \text{PctH}_{75})\} \Rightarrow (x_j^{*75})_{j=s,\ldots,T}$ $(x_j^{*90})_{j=s,\ldots,T} = \arg_x \min\{E(\text{Cost}_s|(x_j)_{j=s,\ldots,T}, N_s, SC_s, MC_s, TI_{s+1} = \text{PctH}_{90})\} \Rightarrow (x_j^{*90})_{j=s,\ldots,T}$ Regardless of the optimization technique used, at step 214, the optimal trading strategy for the upcoming bin (or the multiple upcoming bins, depending on the configuration of the system) may be, due in part to the possibility of non-solution events, an output to the user (or alternatively to another system for manual or automatic execution of the optimal trading strategy). Once the optimal trading strategy has been displayed to the user, the user may execute the strategy utilizing known trading systems and techniques. The output of the system may be a clear description of how many shares should be traded in the next bin to best achieve the overall trade objective. For example, one output could be an instruction: "BUY 100,000 IBM during the next bin." Additionally, confidence levels can be provided for the trade strategy output. Additionally, the system may output the transaction cost for executing the trade, as being determined previously at step 212. Further, an additional strategy output may be provided by the system, such as at what minimum or maximum prices the trades should be executed.

At step 216, the system determines if all of the shares of the order have been traded. If there are no remaining shares to be traded, the algorithm terminates at step 218. However, if at step 216 it is determined that there are remaining shares to be traded, the system continues to steps 202 and 204 and completes another iteration for the upcoming bin. The inputs at step 202 may be adjusted at any time, including the time prior to, during, or after a bin.

Provided the order size and the existing market sentiment have been specified, the model of the current invention may calculate certain characteristics of the cost distribution of possible outcomes, including the mean, E, and the expected average execution price, avgP, over the specified time frame. This model may also suggest optimal bounds for the number of shares to be traded in the specified time frame, as discussed above in step 214. Thus, this model can provide not only an ex-ante optimal strategy but also the simulated ex-post strategies for different outcomes. This would allow a trader to understand how much deviation from the proposed optimal strategy can be tolerated without risking an unacceptable adverse affect due to opportunity costs.

The present invention may be used to trade more or less aggressively, depending on whether the stock is moving up or down. This can be particularly useful in volatile markets, during which rapid price movements can result in significantly higher costs, and traders must complete their orders at the best price possible.

Some embodiments of the present invention may account for signals about market conditions during the execution of an order. Signals may be constructed for many variables including volatility, volume, and spread. Some of these real-time variables are "smart indicators." The smart indicators are analytics that provide indication of abnormal market conditions. The present invention can combine smart indicator-based analytics with a set of definitions describing how to use the information, such that the information may be used during the optimization, as described above in step 212.

Figure 4:
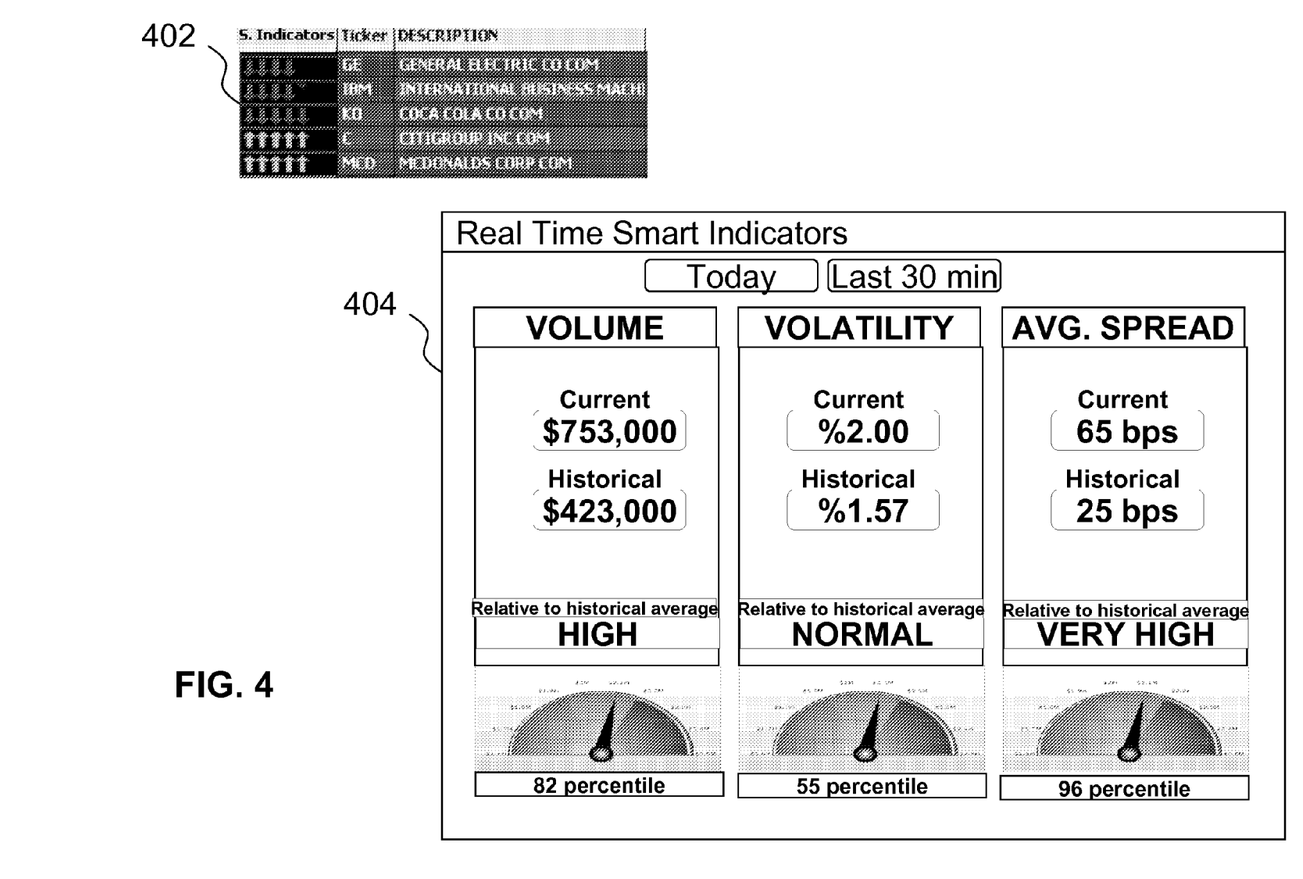
Figure 5:
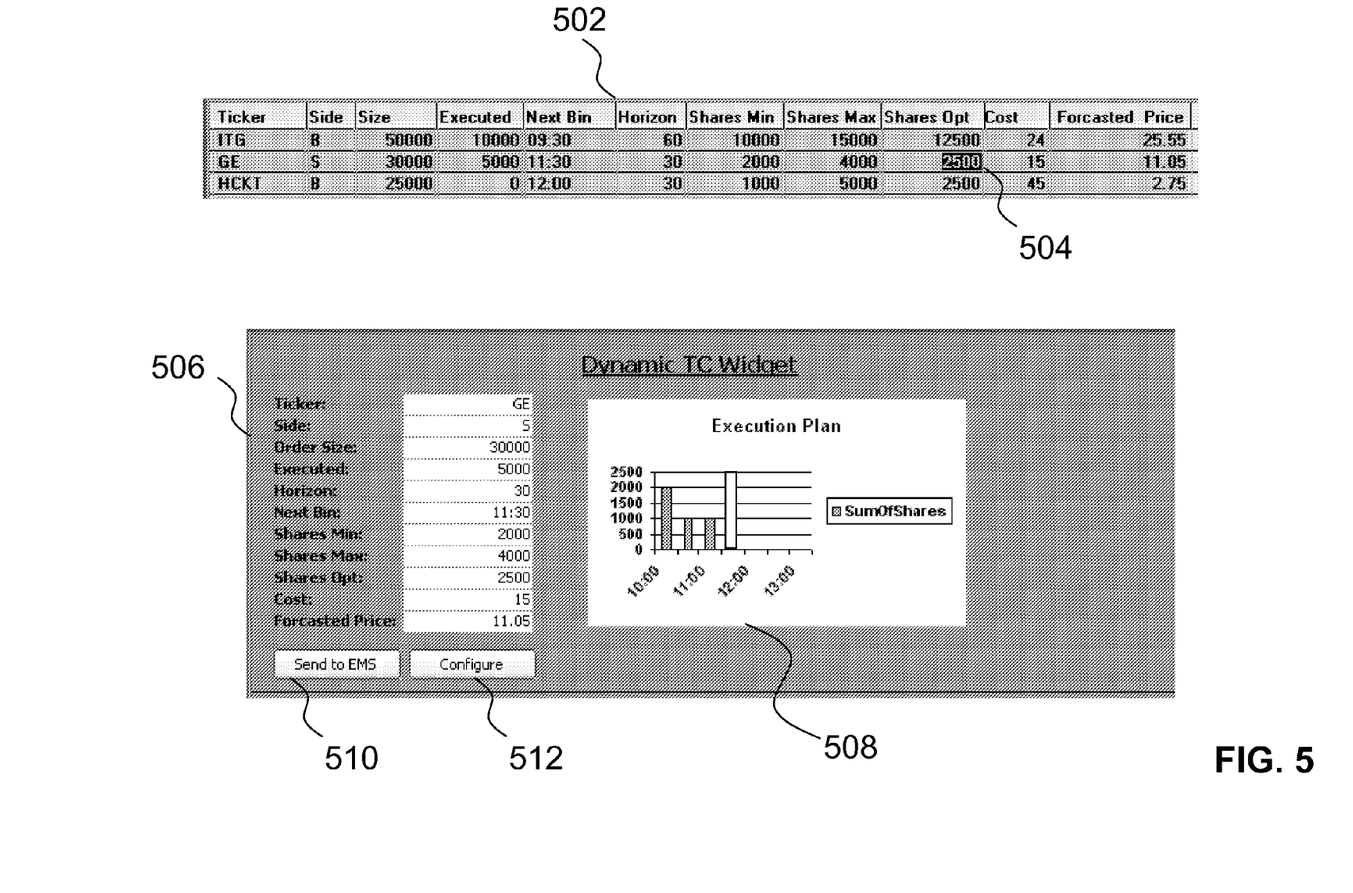

FIGS. 3-5 are screen shots of exemplary graphical user interfaces (GUIs) of embodiments of the present invention. GUIs of the invention can be configured to control and perform aspects of the invention as described above. The results of the above described embodiments of the present invention may be communicated or displayed to users in graphical formats, e.g., charts, graphs, etc. FIGS. 3-5 are the property of ITG Inc., and are protected under copyright laws of the United States.

As illustrated in FIGS. 3-5, embodiments of the present invention may include an interface, which could be, for example, a chart or spreadsheet based interface for submitting information regarding orders, preferences, etc., and for displaying results to a user, consistent with the above-described embodiments. These types of interfaces are common to systems used in financial trading, e.g., OMS and EMS. Thus, the user interface of the present invention may be incorporated into the GUI of an OMS or EMS, and can be implemented with known hardware and software components. Additionally, the user interface of the present invention may be web enabled and accessible through a browser, such as: Microsoft's Internet Explorer, Google's Chrome, or Mozilla's Firefox. Further, because the current invention contemplates integration with other financial trading systems, it is likewise contemplated that implementations of user interface will vary and are in no way limited to the examples illustrated in FIGS. 3-5.

FIG. 3 is an example of how an embodiment of the invention could be accessed and displayed in an EMS, such as ITG Triton®. In the current example, an EMS screen 302 includes a graphical representation of the projected trade schedule generated by an embodiment of the current invention 304. The graphical representation of the projected trade schedule 304 may be interactive, allowing the user to view an enhanced projected trade schedule 306. In one embodiment, a configuration screen 308 may be accessed either from the EMS screen 302, the enhanced projected trade schedule 306, or some other menu. The configuration screen 308, in one embodiment, allows users to change the assumptions and inputs used by embodiments of the current invention. Some of these assumptions and inputs, as discussed above, include: horizon, urgency, risk tolerance, volume, spread, and price trend.

FIG. 4 is an example of how one embodiment of the current invention might integrate a graphical representation of smart indicators, as described earlier in the application. In one embodiment, the smart indicators are accessed in a browser, through a "widget-style" graphical interface 402, or through other such display mechanisms. In one embodiment, the widget-style graphical interface 402 is interactive. For example, in FIG. 4 a detailed smart indicator screen 404 is accessed through the widget-style graphical interface 402. Co-owned/co-pending U.S. Provisional Patent Application No. 61/103,719. titled Systems, Methods and Computer Products for Providing Widgets for Performing Dynamic Trading Analytics in a Financial Trading System, and filed on Oct. 8, 2008. includes a detailed discussion of widget-style GUIs, the entire contents of which are herein incorporated by reference.

FIG. 5 is an example of how an embodiment of the invention could be accessed and displayed. In one embodiment of the present invention, the information used by and outputted from the current invention can be shown in tabular or graphical format 502. This interface allows for the user to interact with the values and underlying settings of the model. The interface also allows for interaction with an EMS, as discussed above, or an execution server to facilitate the execution of trades suggested by the invention. In this example, a user, by interacting with or clicking on the field Shares Opt 504, can bring up or otherwise access the Dynamic TC Widget 506. Using the Dynamic TC Widget 506 a user can change the underlying trade information and reconfigure the trade strategy by pressing the confirm button 512. Additionally, a user can view a graphical representation of the trade strategy 508. In some embodiments, a user can execute the trade strategy. This can be done by pressing the Send to EMS button 510.

Various embodiments of the current invention could be implemented using a combination of both hardware and software components. For example, embodiments of the current invention could be implemented using a Hewlett-Packard DL380 G6 with an Intel Xeon Processor x5560, 72 gigabytes of random access memory, a graphics processor, input/output devices (e.g., mouse, keyboard, monitor), and storage (e.g., one or more hard disk drives) as a trade optimization server. Additionally, in the current example, the trade optimization server could be executing Red Hat Linux as an operating system. Additionally, in the current example, an electronic data storage facility comprises a combination of a server, either the afore mentioned trade optimization server or a different server, and a database software application, such as Sybase ASE 15. Additionally, in the current example, the embodiment of the invention includes an application server comprising a combination of a server, either the afore mentioned trade optimization server or a different server, and an application server software application, such as JBOSS 4.3. One of ordinary skill in the art will readily understand that embodiments of the current invention could be implemented on other hardware and software combinations.

One of ordinary skill in the art will readily understand that the system can be based on architectures such as the Internet, an intranet, a client server, a centralized server, distributed servers, etc. The invention being thus described, it will be apparent to those skilled in the art that the same may be varied in many ways without departing from the spirit and scope of the invention. Any and all such modifications are intended to be included within the scope of the invention.

We claim:

1. A computerized method for adaptive transaction cost estimation, said computerized method comprising the steps of:
   a. receiving at a trade optimization server, electronic information defining a proposed order to trade one or more assets on an electronic exchange or marketplace, wherein the electronic information is stored, by the trade optimization server, in an electronic data storage facility and comprises, for each of the one or more assets in the proposed order to trade, information identifying:
      i. security name, symbol, or identifier,
      ii. transaction side, and
      iii. total quantity to be traded;
   b. receiving at the trade optimization server, electronic market data comprising historical market data and current market data relating to the one or more assets;
   c. determining, through the use of an optimization algorithm at the trade optimization server, an optimum trading strategy and a transaction cost estimate for implementing the proposed order, based upon the proposed trade order, at least one pre-selected trading parameter, and the electronic market data;
   d. outputting an indication of a quantity of the one or more assets to be traded in an upcoming time period according to the determined optimum trading strategy and the transaction cost estimate, the quantity to be traded being less than or equal to the total quantity to be traded; and
   e. receiving at the trade optimization server, a potential trade imbalance of an upcoming time period, wherein the potential trade imbalance is based at least on the electronic information reflecting a proposed trade order and the received electronic market data;

wherein the optimum trading strategy and the transaction cost estimate for implementing the proposed order are each additionally based on the potential trade imbalance of an upcoming time period.

2. The computerized method of claim 1, wherein the method further includes the step of:

f. receiving at the trade optimization server a distribution of realized effective spread and a distribution of realized permanent price impact of an upcoming time period, wherein the distribution of realized effective spread and the distribution of realized permanent price impact are based on at least the potential trade imbalance of an upcoming time period and the received electronic market data;

wherein the optimum trading strategy and the transaction cost estimate for implementing the proposed order are each at least additionally based on the distribution of realized effective spread and the distribution of realized permanent price impact of an upcoming time period.

3. The computerized method of claim 1, wherein said step of receiving at a trade optimization server, electronic information reflecting a proposed order, further comprises:

accessing an order management system database by at least one computer and retrieving the electronic information reflecting unplaced orders and creating the electronic information for the potential order based on the retrieved information reflecting unplaced orders.

4. The computerized method of claim 1, wherein the at least one pre-selected trading parameter is selected from the following list:

a. time horizon of a potential order;
b. level of discretion of a potential order;
c. expected condition of an upcoming bin; and
d. specification of a function for determining an impact on trade imbalance by the proposed order, wherein the potential trade imbalance of an upcoming time period is additionally based on the function.

5. The computerized method of claim 1, wherein said step of outputting an indication of a quantity of the one or more assets to be traded in an upcoming time according to the determined optimum trading strategy and the transaction cost estimate, further comprises:

communicating to a trading venue via an electronic network an electronic trade order to trade a quantity of a corresponding tradeable asset equal to the indication of a quantity output, in the upcoming time period.

6. A system for adaptive transaction cost estimation in an electronic trading system, comprising:

a trading optimization server configured to receive electronic information defining a proposed order to trade one or more assets on an electronic exchange or marketplace, to store the electronic information in an electronic data storage facility, to receive electronic market data comprising historical market data and current market data relating to the one or more assets, to determine, through the use of an optimization algorithm, an optimum trading strategy and a transaction cost estimate for implementing the proposed order, based upon the proposed trade order, at least one pre-selected trading parameter, and the electronic market data, and to output an indication of a quantity of the one or more assets to be traded in an upcoming time period according to the determined optimum trading strategy and the transaction cost estimate, the quantity to be traded being less than or equal to the total quantity to be traded;

wherein the electronic information comprises, for each of the one or more assets in the proposed order to trade, information identifying:

i. security name, symbol, or identifier,
ii. transaction side, and
iii. total quantity to be traded, and wherein the trading optimization server is further configured to receive a potential trade imbalance of an upcoming time period, wherein the potential trade imbalance is based on at least the electronic information reflecting a proposed trade order and the received electronic market data, and to determine the optimum trading strategy and the transaction cost estimate for implementing the proposed order, each additionally based on the potential trade imbalance of an upcoming time period.

7. The system of claim 6, wherein the trading optimization server is further configured to receive a distribution of realized effective spread and a distribution of realized permanent price impact of an upcoming time period, wherein the distribution of realized effective spread and the distribution of realized permanent price impact are based on at least the potential trade imbalance of an upcoming time period and the received electronic market data;

wherein the optimum trading strategy and the transaction cost estimate for implementing the proposed order are each at least additionally based on the distribution of realized effective spread and the distribution of realized permanent price impact of an upcoming time period.

8. The system of claim 6, further comprising a order data extraction device configured to access an order management system database by at least one computer and retrieve the electronic information reflecting unplaced orders and create the electronic information for the potential order based on the retrieved information reflecting unplaced orders.

9. The system of claim 6, wherein the at least one pre-selected trading parameter is selected from the following list:

e. time horizon of a potential order;
f. level of discretion of a potential order;
g. expected condition of an upcoming bin; and
h. specification of a function for determining an impact on trade imbalance by the proposed order, wherein the potential trade imbalance of an upcoming time period is additionally based on the function.

10. The system of claim 6, further comprising a trade order generation device configured to communicate to a trading venue, via an electronic network, an electronic trade order to trade a quantity of a corresponding tradeable asset equal to the indication of a quantity output, in the upcoming time period.

11. A non-transitory computer readable medium having stored thereon computer executable instructions for adaptive transaction cost estimation when executed by performing the following operations:

a. receiving at a trade optimization server, electronic information defining a proposed order to trade one or more assets on an electronic exchange or marketplace, wherein the electronic information is stored, by the trade optimization server, in an electronic data storage facility and comprises, for each of the one or more assets in the proposed order to trade, information identifying:

i. security name, symbol, or identifier,
ii. transaction side, and
iii. total quantity to be traded;

b. receiving at the trade optimization server, electronic market data comprising historical market data and current market data relating to the one or more assets;

c. determining, through the use of an optimization algorithm at the trade optimization server, an optimum trading strategy and a transaction cost estimate for implementing the proposed order, based upon the proposed trade order, at least one pre-selected trading parameter, and the electronic market data;

d. outputting an indication of a quantity of the one or more assets to be traded in an upcoming time period according to the determined optimum trading strategy and the transaction cost estimate, the quantity to be traded being less than or equal to the total quantity to be traded; and e. receiving at the trade optimization server, a potential trade imbalance of an upcoming time period, wherein the potential trade imbalance is based on at least the electronic information reflecting a proposed trade order and the received electronic market data;

wherein the optimum trading strategy and the transaction cost estimate for implementing the proposed order are each additionally based on the potential trade imbalance of an upcoming time period.

12. The non-transitory computer readable medium of claim 11, further including the executable instructions for performing the operation of:

f. receiving at the trade optimization server a distribution of realized effective spread and a distribution of realized permanent price impact of an upcoming time period, wherein the distribution of realized effective spread and the distribution of realized permanent price impact are based on at least the potential trade imbalance of an upcoming time period and the received electronic market data;

wherein the optimum trading strategy and the transaction cost estimate for implementing the proposed order are each at least additionally based on the distribution of realized effective spread and the distribution of realized permanent price impact of an upcoming time period.

13. The non-transitory computer readable medium of claim 11, wherein in the operation of receiving at a trade optimization server, electronic information reflecting a proposed order, further comprises:

accessing an order management system database by at least one computer and retrieving the electronic information reflecting unplaced orders and creating the electronic information for the potential order based on the retrieved information reflecting unplaced orders.

14. The non-transitory computer readable medium of claim 11, wherein the at least one pre-selected trading parameter is selected from the following list:
   i. time horizon of a potential order;
   j. level of discretion of a potential order;
   k. expected condition of an upcoming bin; and
   l. specification of a function for determining an impact on trade imbalance by the proposed order, wherein the potential trade imbalance of an upcoming time period is additionally based on the function.

15. The non-transitory computer readable medium of claim 11, wherein said operation of outputting an indication of a quantity of the one or more assets to be traded in an upcoming time period according to the determined optimum trading strategy and the transaction cost estimate, further comprises:
   communicating to a trading venue via an electronic network an electronic trade order to trade a quantity of a corresponding tradeable asset equal to the indication of a quantity output, in the upcoming time period.

16. A system for adaptive transaction cost estimation, comprising:
   means for receiving at a trade optimization server, electronic information defining a proposed order to trade one or more assets on an electronic exchange or marketplace, wherein the electronic information is stored, by the trade optimization server, in an electronic data storage facility and comprises, for each of the one or more assets in the proposed order to trade, information identifying:
      i. security name, symbol, or identifier,
      ii. transaction side, and
      iii. total quantity to be traded;
   means for receiving at the trade optimization server, electronic market data comprising historical market data and current market data relating to the one or more assets;
   means for determining, through the use of an optimization algorithm at the trade optimization server, an optimum trading strategy and a transaction cost estimate for implementing the proposed order, based upon the proposed trade order, at least one pre-selected trading parameter, and the electronic market data;
   means for outputting an indication of a quantity of the one or more assets to be traded in an upcoming time period according to the determined optimum trading strategy and the transaction cost estimate, the quantity to be traded being less than or equal to the total quantity to be traded; and
   means for receiving at the trade optimization server, a potential trade imbalance of an upcoming time period, wherein the potential trade imbalance is based on at least the electronic information reflecting a proposed trade order and the received electronic market data;
   wherein the optimum trading strategy and the transaction cost estimate for implementing the proposed order are each additionally based on the potential trade imbalance of an upcoming time period.

17. The system of claim 16, further comprising means for receiving at the trade optimization server a distribution of realized effective spread and a distribution of realized permanent price impact of an upcoming time period, wherein the distribution of realized effective spread and the distribution of realized permanent price impact are based on at least the potential trade imbalance of an upcoming time period and the received electronic market data;
   wherein the optimum trading strategy and the transaction cost estimate for implementing the proposed order are each at least additionally based on the distribution of realized effective spread and the distribution of realized permanent price impact of an upcoming time period.

18. The system of claim 16, wherein means for receiving at a trade optimization server, electronic information reflecting a proposed order, further comprises:
   means for accessing an order management system database by at least one computer and retrieving the electronic information reflecting unplaced orders and creating the electronic information for the potential order based on the retrieved information reflecting unplaced orders.

19. The system of claim 16, wherein the at least one pre-selected trading parameter is selected from the following list:
   m. time horizon of a potential order;
   n. level of discretion of a potential order;
   o. expected condition of an upcoming bin; and
   p. specification of a function for determining an impact and trade imbalance by the proposed order, wherein the potential trade imbalance of an upcoming time period is additionally based on the function.

20. The system of claim 16, further comprising means for communicating to a trading venue via an electronic network an electronic trade order to trade a quantity of a corresponding tradeable asset equal to the indication of a quantity output, in the upcoming time period.

* * * * *